United States Patent [19]

Smith, Jr. et al.

[11] Patent Number: 5,377,705

[45] Date of Patent: Jan. 3, 1995

[54] PRECISION CLEANING SYSTEM

[75] Inventors: Charles W. Smith, Jr.; Larry R. Rosio, both of Fairview; Stephen H. Shore; James A. Karle, both of Erie, all of Pa.

[73] Assignee: Autoclave Engineers, Inc., Erie, Pa.

[21] Appl. No.: 122,766

[22] Filed: Sep. 16, 1993

[51] Int. Cl.⁶ ............................................. B08B 3/10
[52] U.S. Cl. ............................ 134/95.3; 134/103.1; 134/105; 134/107; 134/902
[58] Field of Search ............... 134/76, 107, 108, 109, 134/902, 95.3, 95.1, 103.1, 200, 105

[56] References Cited

U.S. PATENT DOCUMENTS

| | | | |
|---|---|---|---|
| 2,617,719 | 11/1952 | Stewart | 23/312 |
| 4,029,517 | 6/1977 | Rand | 68/18 C |
| 4,091,643 | 5/1978 | Zucchini | 68/18 C |
| 4,474,199 | 10/1984 | Blaudszun | 134/105 |
| 4,601,181 | 7/1986 | Privat | 68/18 C |
| 4,788,043 | 11/1988 | Kagiyama et al. | 422/292 |
| 4,865,061 | 9/1989 | Fowler et al. | 134/109 |
| 4,879,004 | 11/1989 | Oesch et al. | 203/89 |
| 4,983,223 | 1/1991 | Gessner | 134/108 |
| 5,011,542 | 4/1991 | Weil | 134/38 |
| 5,013,366 | 5/1991 | Jackson et al. | 134/1 |
| 5,068,040 | 11/1991 | Jackson | 210/748 |
| 5,143,103 | 9/1992 | Basso et al. | 134/98.1 |
| 5,193,560 | 3/1993 | Tanaka et al. | 134/108 X |
| 5,267,455 | 12/1993 | Dewees et al. | 68/18 C |

OTHER PUBLICATIONS

Technical Support Package For Cleaning With Supercritical $CO_2$ MFS-29611 NASA Tech Briefs, "Cleaning Metal Substrates Using Liquid/Supercritical Fluid Carbon Dioxide", Keith M. Motyl, pp. 1-31, MSFC-Cover 18 (Mar. 1979).

Primary Examiner—Frankie L. Stinson
Attorney, Agent, or Firm—Webb Ziesenheim Bruening Logsdon Orkin & Hanson

[57] ABSTRACT

An improved precision cleaning method includes introducing a solvent to a cleaning vessel, placing a workpiece in the cleaning vessel and contacting the workpiece with the solvent during a residence period. The cleaning vessel is then pressurized to a target pressure by adding carbon dioxide to the vessel, and additional carbon dioxide is pumped into the vessel while maintaining the target pressure to flush contents of the vessel. Cleaning may be enhanced by pressurizing to above the supercritical point of the carbon dioxide, and cleaning is further enhanced by application of sonic energy or mechanical agitation.

7 Claims, 7 Drawing Sheets

PRECISION CLEANING SYSTEM

RELATED APPLICATIONS

This patent application is related to pending U.S. patent application Ser. No. 07/967,261, filed Oct. 27, 1992 entitled "Apparatus For Applying Ultrasonic Energy In Precision Cleaning" and pending U.S. patent application Ser. No. 07/967,219, filed Oct. 27, 1992 entitled "Apparatus For Supercritical Cleaning".

BACKGROUND OF THE INVENTION

1. Field of the Invention

This invention is related to a precision cleaning method and, more particularly, a cleaning method utilizing pressurized gases, such as carbon dioxide, along with solvents which are environmentally acceptable.

2. Description of the Prior Art

It is desirable to remove in a precise and repeatable manner organic, particulate, and ionic contamination from components and assemblies without the use of environmentally sensitive solvents (solvents considered to endanger the environment), water rinses, and extensive post-cleaning drying. It has been proposed to utilize carbon dioxide, alone and in combination with other solvents, to conduct cleaning. For example, U.S. Pat. No. 5,013,366 discloses a cleaning process using phase shifting (shifting to and from the supercritical phase) and dense phase gases wherein carbon dioxide is the preferred dense phase gas. This patent discloses that carbon dioxide may be mixed with co-solvents, such as anhydrous ammonia gas, and compressed to the supercritical state. This patent also discloses the general concept of utilizing carbon dioxide, co-solvents, and ultrasonic energy to enhance cleaning. U.S. Pat. No. 5,068,040 discloses that supercritical ozone dissolved in liquid or supercritical carbon dioxide or water is an excellent solvent/oxidant for inorganic material. However, the presence of water presents problems with water recycling and disposal. Finally, U.S. Pat. No. 2,617,719 discloses a method and apparatus for cleaning porous media, such as oil-bearing sandstone. The cleaning cell is supplied with a solvent and a dissolved gas, such as carbon dioxide. Used solvent is vented to the atmosphere. Solvent venting creates hazards to the environment which are unacceptable by today's standards.

Additional cleaning, extracting and stripping methods are shown in U.S. Pat. Nos. 4,879,004; 5,011,542; 4,788,043 and 5,143,103.

As intimated in the patents referred to above, supercritical carbon dioxide alone cannot remove all contaminants from parts and assemblies. The range of contaminants encountered includes low molecular weight organic compounds which are nonpolar in nature, high molecular weight nonpolar organic compounds, ionic compounds (such as fingerprints) and high molecular weight polar organic compounds (such as fats). It has been found that carbon dioxide cannot remove all of these contaminants, even when augmented with sonic or mechanical agitation.

Thus, it is an object of the present invention to provide a method and apparatus for precision removal of organic, particulate and ionic contamination from components and assemblies without the use of environmentally sensitive solvents, water rinses, and extensive post-cleaning drying.

It is a further object to capture the removed contaminants and automatically remove the contaminants from the cleaning system for disposal. It is a further object to allow for use of environmentally acceptable co-solvents while limiting the contamination of a workpiece by the co-solvent. It is a further object to avoid release of co-solvents to the atmosphere. It is a further object to provide separation and concentration of carbon dioxide, co-solvent and contaminants for ease of handling, storage and disposal.

SUMMARY OF THE INVENTION

Briefly, according to this invention, there is provided a method for cleaning a workpiece wherein co-solvent and at least one workpiece are placed in the cleaning vessel. The cleaning vessel is then pressurized to a target pressure by adding carbon dioxide to the vessel. Additional carbon dioxide is then pumped through the vessel while maintaining the target pressure to flush the contents of the vessel. The flushing reduces the concentration of co-solvents and contaminants in the vessel reducing the potential for redeposition of co-solvent and contaminants on the workpiece during depressurization of the vessel.

According to a preferred method, the cleaning vessel is purged with a purge gas prior to introduction of the co-solvent. In a further preferred method, ultrasonic energy is applied to the co-solvent and the workpiece during a residence period prior to pressurization. In still another preferred method, the workpiece and/or the co-solvent is mechanically agitated during the residence period.

It is preferable that the target pressure be above the supercritical pressure of at least one fluid component in the cleaning vessel, usually, the carbon dioxide.

It is also preferable to direct the fluid contents of the cleaning vessel to a regeneration circuit for separating co-solvent and contaminants from the carbon dioxide.

An especially preferred method includes the step of pre-cleaning the workpiece in a co-solvent prior to placing the workpiece in the cleaning vessel. In this embodiment, co-solvent is carried into the cleaning vessel on the surface of the workpiece.

In a preferred embodiment, the method for cleaning a workpiece includes contacting the workpiece with a co-solvent, such as by pre-dipping with sonic agitation, and placing the workpiece in a pressure vessel. The pressure vessel is then pressurized to a target pressure by pumping carbon dioxide into the vessel, and upon reaching the target pressure, additional carbon dioxide is pumped through the vessel to flush the fluid contents of the vessel. The temperature of the fluid and the target pressure are preferably above the supercritical temperature and pressure of the carbon dioxide in the pressure vessel.

Also, according to this invention, there is provided a system or apparatus for carrying out the above method. The system for cleaning a workpiece with a supercritical cleaning fluid comprises a cleaning vessel for receiving the workpiece. The cleaning vessel has an inlet and an outlet. The outlet is preferably near or in the bottom of the vessel. A letdown valve is in communication with said outlet and may be manipulated to assist in control of the pressure in the vessel and for draining the vessel. A heater is provided for controlling the temperature of the cleaning fluid in the cleaning vessel. A separator is in communication with the letdown valve having a first outlet near the upper end and a second outlet at a lower end of the separator. The temperature and pressure of the separator vessel are controllable to effect the separation of carbon dioxide and the co-solvent. A condenser is in communication with the separator's first outlet for condensing gaseous cleaning fluid to a liquid state. A storage vessel maintains a supply of the liquid cleaning fluid. A pump conveys the cleaning fluid from the storage vessel to the cleaning vessel and a co-solvent delivery vessel. The co-solvent delivery vessel is in communication with the co-solvent supply vessel. The co-solvent delivery vessel is in communication with a pump and the cleaning vessel such that the cleaning fluid can be passed through the co-solvent delivery vessel to carry co-solvent into the cleaning vessel. The system is arranged so that the liquid cleaning fluid and co-solvent are pumped into the cleaning vessel and caused by temperature and pressure to achieve a supercritical state with the cleaning fluid. Typically, the pressure will exceed 1,000 psi. The system is arranged so that the cleaning fluid is removed from the cleaning vessel through the letdown valve to pass the cleaning fluid to the separator. Typically, the pressure in the separator will be about 500 psi. The cleaning fluid thereafter passes through the separator outlet to the condenser and from there back to the liquid storage vessel. The separated co-solvent and contaminants collect in the lower end of the separator for removal through the second outlet.

BRIEF DESCRIPTION OF THE DRAWINGS

Further features and other objects and advantages of the invention will become apparent from the following detailed description made with reference to the drawings in which.

DETAILED DESCRIPTION OF THE PREFERRED EMBODIMENTS

Figure 1:
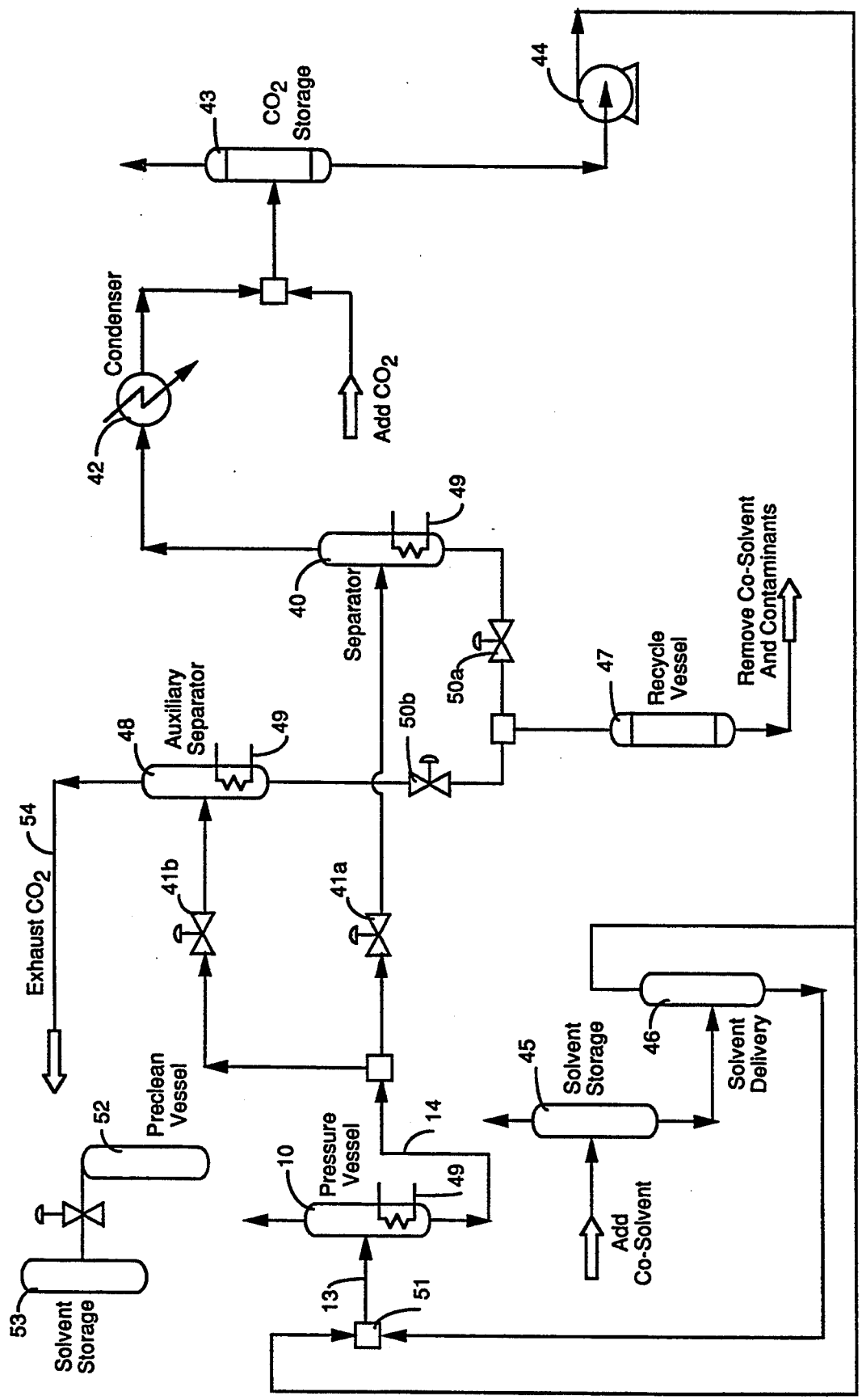
FIG. 1 is a schematic of an apparatus for precision cleaning according to the present invention.
Figure 7:
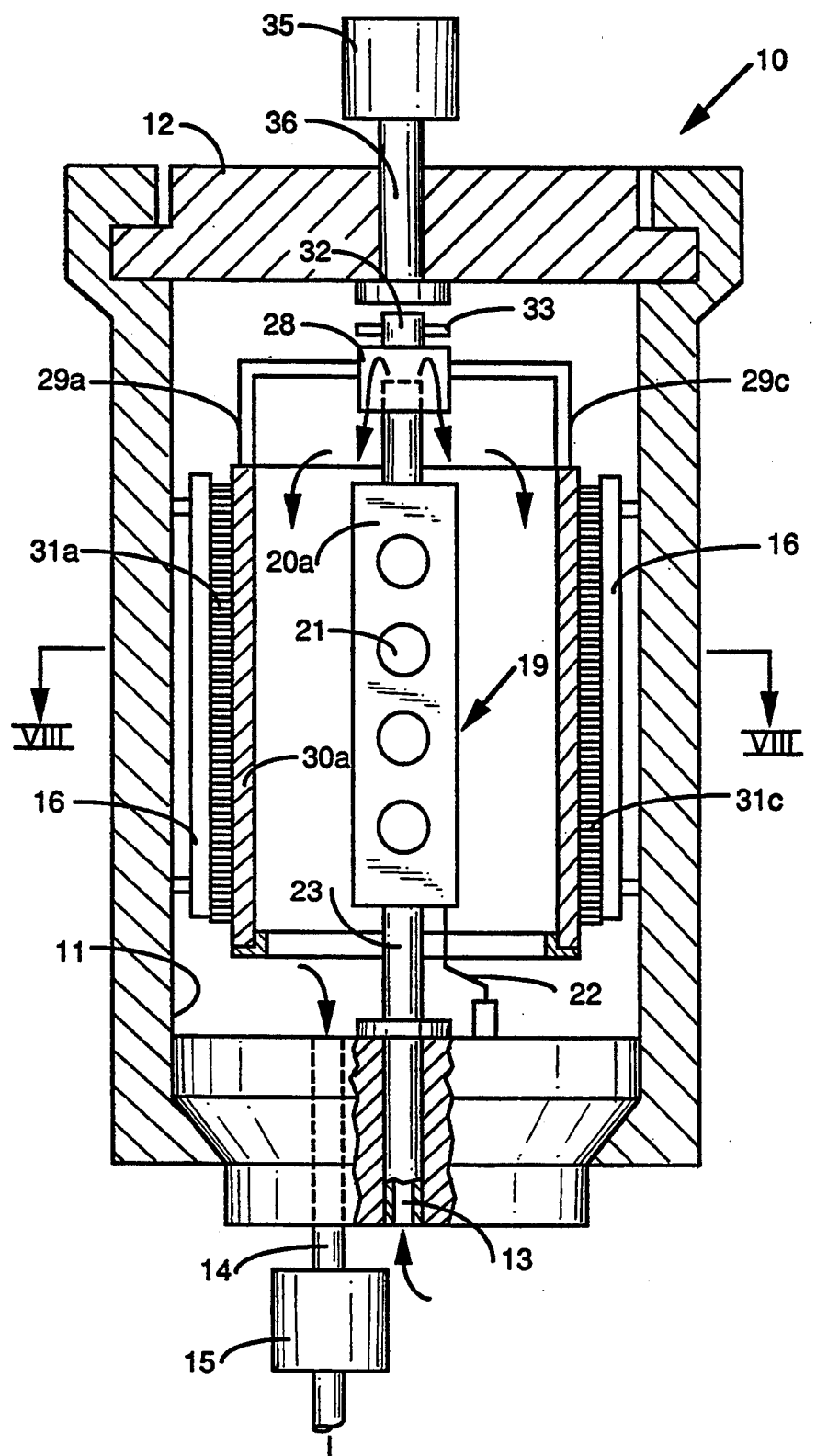
FIG. 7 is a section view through a pressure vessel useful in the practice of this invention.
Figure 8:
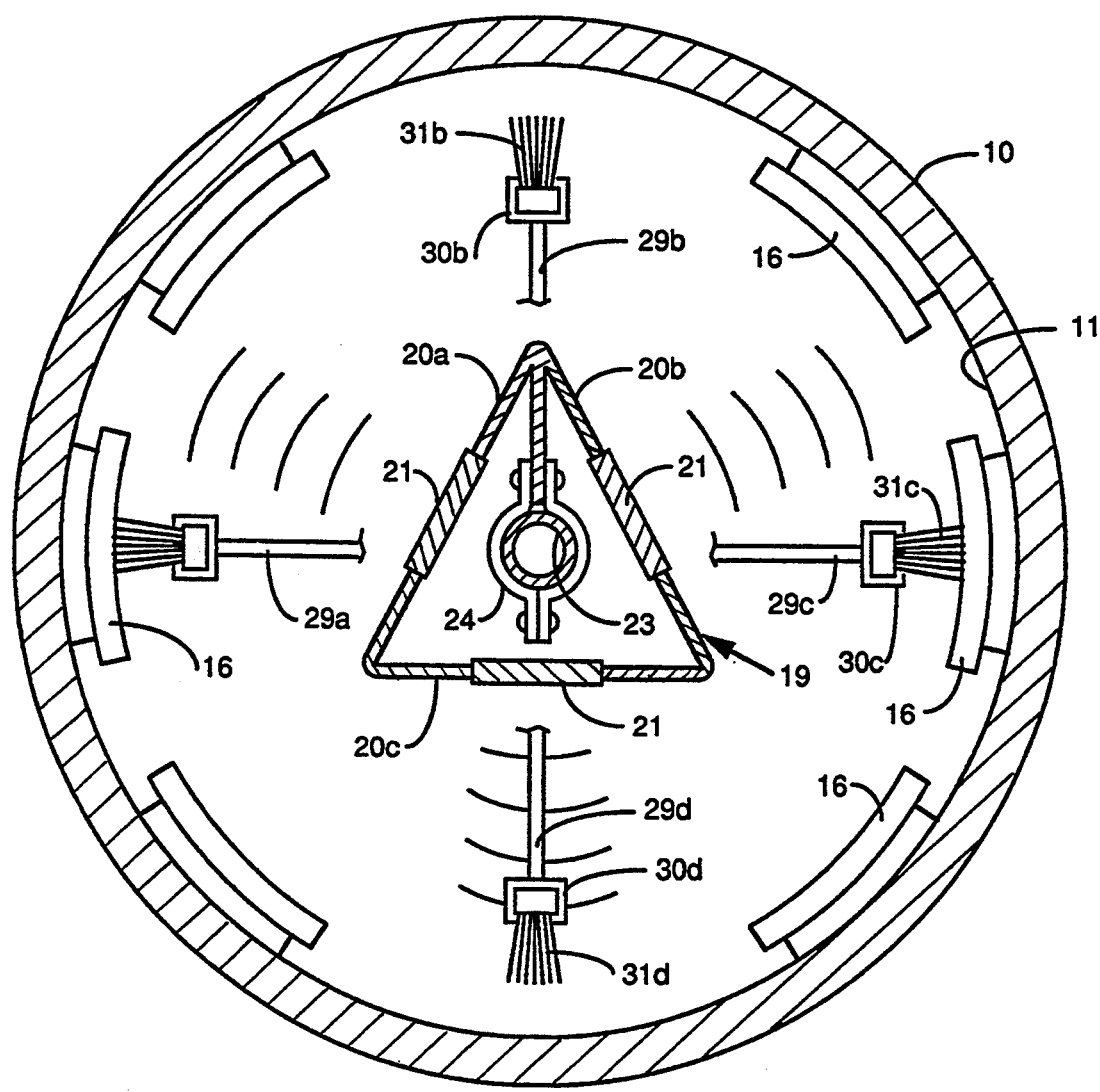
FIG. 8 is a section view of the pressure vessel of FIG. 7 taken along line VIII—VIII.

A system for carrying out the method of the present invention is shown in FIG. 1. The system includes a pressurizable cleaning vessel 10. FIGS. 7 and 8 show a vessel 10 having an interior wall 11 and a removable top cover 12. Applicants have constructed vessels with interiors between 8 to 24 inches in diameter and 12 to 24 inches long, for example. Practically speaking, cleaning vessel 10 is constructed to withstand operating pressures from 900 to 3,000 psig and temperatures up to 85° C.

An inlet 13 admits cleaning fluid to the pressure vessel, and cleaning fluid is withdrawn through outlet 14. A removable filter 15 is located in line with outlet 14 for filtering particulate from the spent cleaning fluid. A suitable workpiece rack 16 is provided for holding the workpieces (not shown) in a secure manner.

A sonic tower 19 is centrally located in the pressure vessel 10. The sonic tower comprises three sonic plates 20a, 20b, 20c arranged to define an elongated triangle. Each modular sonic plate includes a number of transducers 21. Electric power is applied to the transducers by electrical power leads 22. The sonic plates are secured to an upstanding support post 23 by clamps 24. The support post 23 may also serve as a conduit for introducing cleaning fluid to the pressure vessel from inlet 13.

A rotary brushing or agitation device 27 is optionally disposed in the pressure vessel concentric with the sonic tower 19. The brushing device includes an upper hub 28 with four arms 29a, 29b, 29c, 29d extending therefrom. Each arm has a vertically extending brush holder 30a, 30b, 30c and 30d. A replaceable brush 31a, 31b, 31c, 31d is slidably captured in each holder.

The hub 28 has an upstanding drive post 32 with a pair of splines 33 extending from the drive post. A motor 35 is mounted in the top cover 12 with a drive coupling 36 extending through the top cover. The drive coupling removably receives the splines 33 to rotate the post 32 and arms 29a, 29b, 29c, 29d for brushing the workpieces. The motor 35 is operable to rotate the arms in both directions.

Referring again to FIG. 1, the cleaning vessel 10 empties to a separator 40, and flow between cleaning vessel 10 and separator 40 is controlled by a flow control valve 41a. Separator 40 is also in communication with a condenser 42, which condenses the carbon dioxide issuing from separator 40 for storage in a carbon dioxide liquid storage vessel 43.

Carbon dioxide is removed from the storage vessel 43 by a pump 44 for introduction to the cleaning vessel 10. A solvent delivery system, including a solvent storage vessel 45 and a solvent delivery tank 46, is also in communication with cleaning vessel 10. Clean solvent is provided in the storage vessel 45, and measured amounts are delivered to delivery tank 46 for introduction to the cleaning vessel 10.

The system also includes an auxiliary separator 48 having a vent 54 for venting carbon dioxide to the atmosphere. The cleaning vessel 10, the separator 40 and the auxiliary separator 48 are all equipped with heating elements 49 controlling the temperature in those vessels. Valves 50a and 50b control flow from the separators 40 and 48 to the recycle vessel 47. Two-way valve 51 directs either solvent or carbon dioxide-solvent mixture to the vessel 10.

The system may also include a pre-cleaning vessel 52 having its own dedicated pre-dipped solvent storage vessel 53. The system may also include a plurality of solvent storage and solvent delivery vessels, each for supplying a discrete solvent to the cleaning vessel 10.

The above system was specifically developed to address the needs of the user to clean parts having a variety of configurations in a rapid and efficient manner without using environmentally sensitive solvents, such as CFC's, volatile organic compounds, and other ozone depleting chemicals. The system is also designed to replace aqueous or semi-aqueous based cleaning processes to eliminate the problems of moisture damage to parts and water disposal. The system may be controlled by a software driven computer control system, which allows the operator to define and obtain the optimum cleaning conditions, such as pressure, temperature and total flow through the cleaning vessel 10.

The term "supercritical fluid" originates from consideration of the property of gas liquefaction. When a pure gas is compressed at some temperature below a critical value, called the critical temperature, liquefaction (condensation) occurs. At or above the critical temperature, no liquefaction is possible (no matter how much pressure is applied), and a single phase is thus maintained. For example, the critical point of carbon dioxide is 31° C. (88° F.) and 1,070.66 psi (73.82 bar). The dense (or compressed) gas phase, above the critical temperature and typically near or above the critical pressure, is referred to as a "supercritical fluid".

Figure 4:
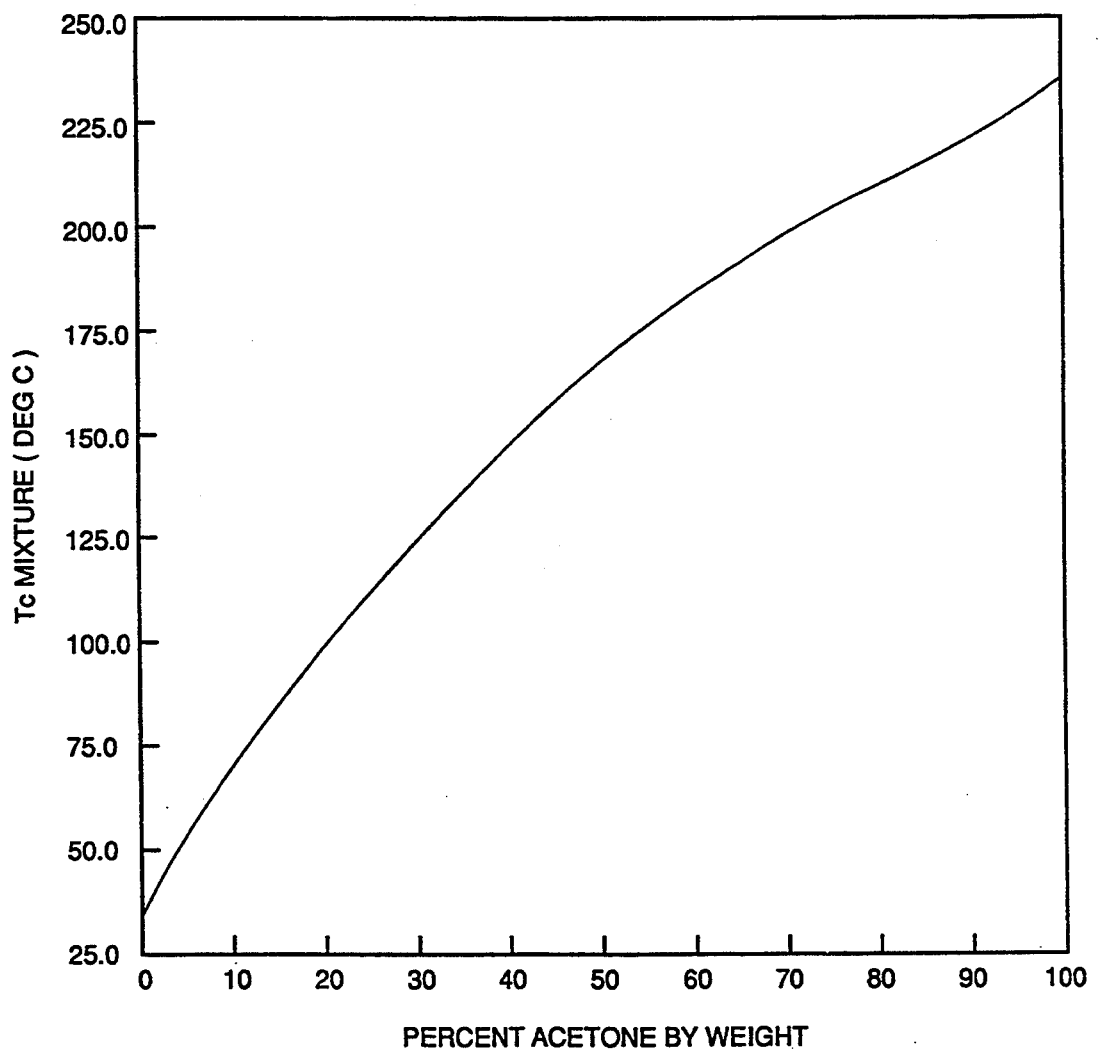
FIG. 4 is a graphic illustration of critical temperature versus percent acetone by weight and carbon dioxide.
Figure 5:
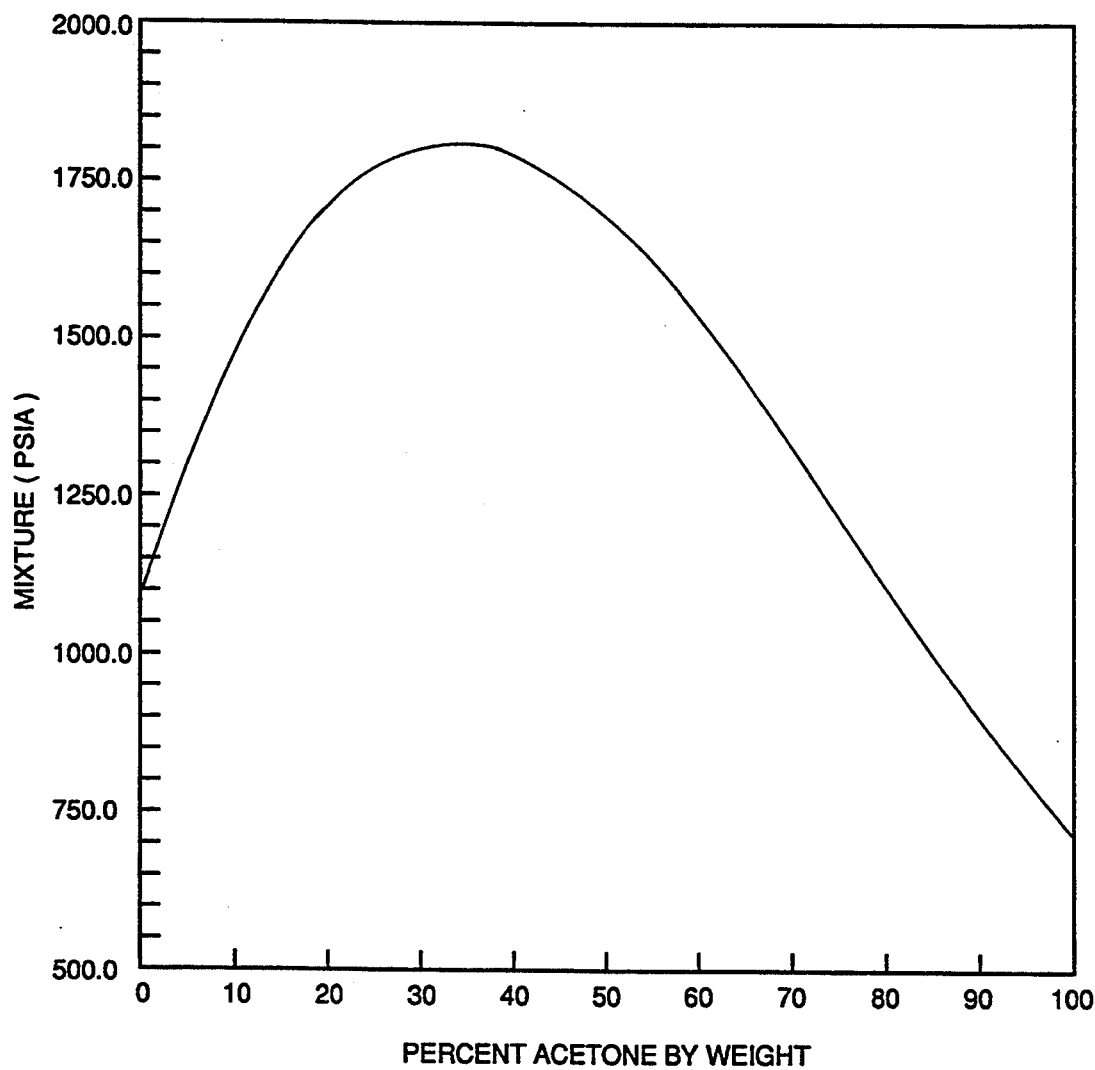
FIG. 5 is a graphic illustration of critical pressure versus percent acetone by weight and carbon dioxide.

In the supercritical phase, carbon dioxide can be compressed to near liquid densities, where it displays good solubilizing properties, favorable mass transport characteristics, low viscosity and high diffusivities, making supercritical carbon dioxide an effective solvent for many molecular non-hydrogen bonding organic substances. However, supercritical carbon dioxide cannot remove all contaminants. Hence, there is a need to add co-solvents to the carbon dioxide, and this need is addressed by the present invention. The addition of co-solvents changes the critical temperatures and pressures as illustrated in FIGS. 4 and 5.

Parts to be cleaned are placed in a specially configured load fixture, such as a parts basket, and the load fixture is then placed in cleaning vessel 10. The cleaning vessel 10 is then pressurized by pumping carbon dioxide into the cleaning vessel. After a target pressure is reached, the fluid inside the cleaning vessel 10 is continuously flushed. Clean carbon dioxide is pumped into the cleaning vessel 10 while contaminated carbon dioxide is removed.

The dissolved contaminants and the spent carbon dioxide continuously flow from the cleaning vessel 10 to the separator 40. The pressure in the separator is below that of the cleaning vessel 10 so that no additional pumping is required. The pressure in the separator 40 is further adjusted so that the contaminant comes out of solution in the carbon dioxide and is captured in the separator. Control of the pressure and temperature of the contents of the separator required for effective separation, i.e., removal of carbon dioxide with as little co-solvent vapor as possible. Relatively clean carbon dioxide continues to flow from the separator 40 and is condensed in a condenser 42 and placed in storage vessel 43 for reuse. Particulates are captured in filters located in both the cleaning vessel 10 and separator 40. Further details regarding the basic operation of the apparatus may be seen in the patent applications identified above.

Figure 2:
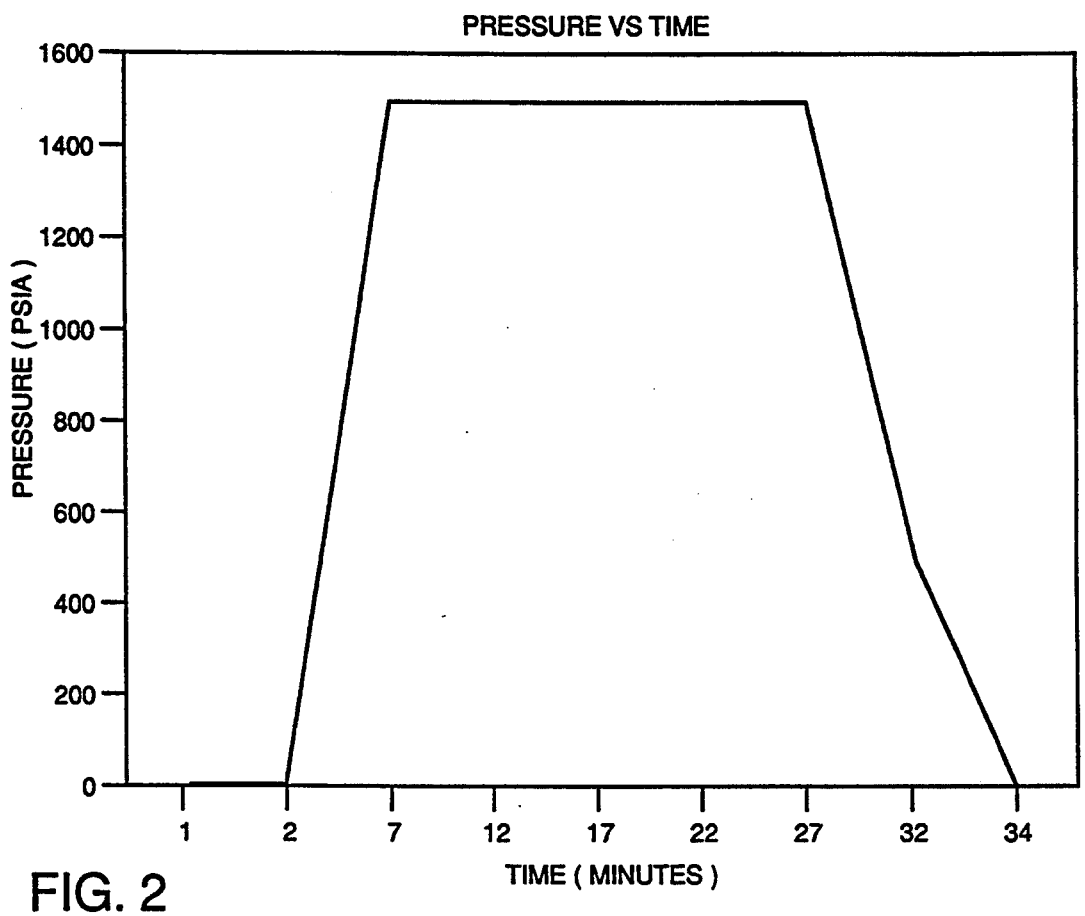
FIG. 2 is a graphic illustration of an exemplary pressure versus time cycle for cleaning with supercritical carbon dioxide and co-solvents according to the present invention.

In a first embodiment, parts to be cleaned are placed in the cleaning vessel, and the cleaning vessel is closed in a pressure-tight manner. The cleaning vessel 10 is purged to remove any residual fluids. The pressure versus time cycle of this embodiment is illustrated in FIG. 2. Pump 44 is then activated to begin introduction of carbon dioxide into cleaning vessel 10, and a predetermined amount of co-solvent is also introduced to the cleaning vessel 10 from delivery tank 46.

Typically, 3-25% co-solvent by weight is utilized. The cleaning vessel 10 is pressurized to a target pressure; for example, 1,000-1,500 psi, which is above the supercritical pressure of carbon dioxide. If the carbon dioxide/co-solvent mixture is homogeneous, the critical pressure of the mixture will vary from that of pure carbon dioxide. If the mixture is heterogeneous, the supercritical carbon dioxide, during circulation in the cleaning vessel, will disperse the co-solvent within the cleaning vessel 10, ensuring complete contact between the parts and the co-solvent.

After the target pressure is reached in the vessel 10, the valve 41a is opened and the valve 41a, in combination with pump 44 and heater 49, is controlled to maintain the target pressure (and temperature) within cleaning vessel 10, albeit that flow through the vessel is continuous. A predetermined number of exchanges is carried out through a given cycle time, usually 15 to 60 minutes. Each exchange theoretically provides complete replacement of the fluid in the cleaning vessel 10. It is assumed that the time required to complete one exchange equals the time required to pressurize the cleaning vessel 10 to the target pressure. Thus, if it takes five minutes to pressurize the cleaning vessel and four vessel exchanges are desired, the cycle time would equal 20 minutes.

After the predetermined number of exchanges are completed, the valve 41a is opened further and pump 44 is turned off to begin a let down of pressure in the cleaning vessel 10. Once the cleaning vessel 10 reaches a predetermined minimum pressure, such as 500 psi, valve 41a is closed and valve 41b is opened to vent the cleaning vessel, through auxiliary separator 48 and vent 54 directly to the atmosphere. This maintains the pressure in the system downstream of the cleaning vessel 10 in excess of 500 psi, for example.

Figure 3:
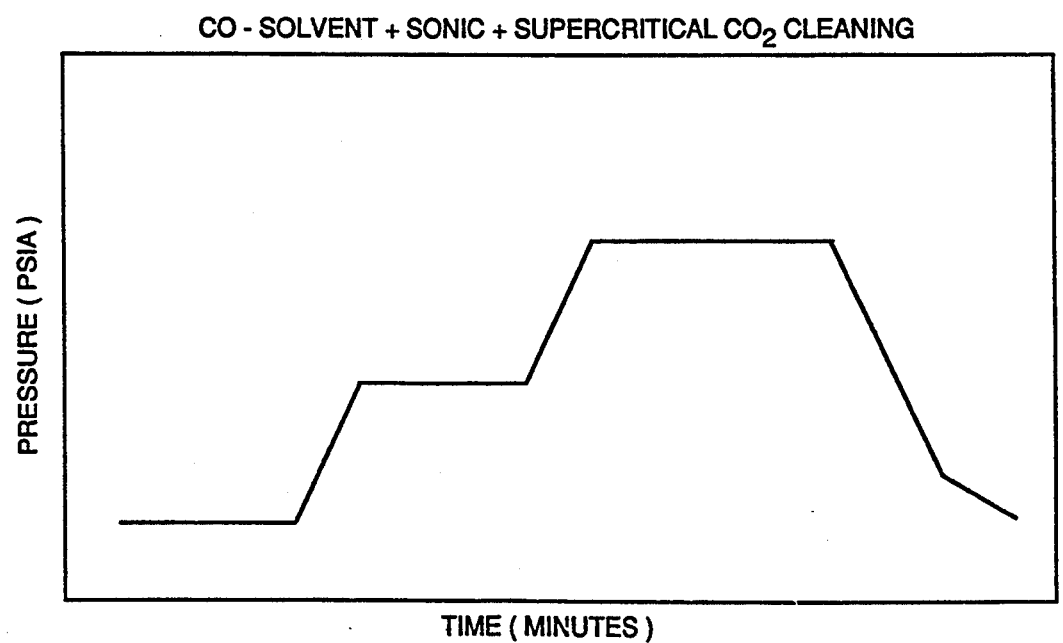
FIG. 3 is a graphic illustration of an exemplary pressure versus time cycle for cleaning with supercritical carbon dioxide, co-solvents, and sonic energy, according to the present invention.

In a second embodiment, a cleaning regimen utilizes co-solvents, sonic application and supercritical carbon dioxide. The pressure versus time cycle of this embodiment is illustrated in FIG. 3. Again, the cleaning vessel 10 is initially purged, and then a predetermined amount of co-solvent, along with carbon dioxide, is pumped into the cleaning vessel. A mid-level pressure is attained whereby a substantial volume of co-solvent and carbon dioxide is in the cleaning vessel 10. Sonic energy is then applied to the liquid for a predetermined period of time. After sonic application, further carbon dioxide is pumped into cleaning vessel 10 to a target pressure above the supercritical pressure of the carbon dioxide/co-solvent mix. A desired number of exchanges is then carried out at the target pressure, and the cleaning vessel is depressurized and vented as described above.

A third embodiment of the invention includes pre-cleaning the parts to be cleaned in a pre-cleaning (sonic/agitated plus dipping) vessel 52 prior to placing them in the cleaning vessel 10. The cleaning vessel 10 in this embodiment is more aptly termed a "rinse and dry" vessel. Co-solvents in addition to the pre-cleaning co-solvent may or may not be added in the rinse and dry cycle. Sonic application is also optional.

The pre-dip may effectively be carried out in the cleaning vessel 10 itself with co-solvent alone added to the cleaning vessel along with sonic or mechanical agitation followed by draining of the co-solvent from the cleaning vessel and application of the supercritical carbon dioxide as discussed above. Preferably, the cleaning vessel is at least partially filled with liquid co-solvent and sealed. Carbon dioxide at about atmospheric pressure is introduced over the top of the liquid co-solvent. Under these conditions, the ultrasound is assured of causing cavitation within the co-solvent promoting cleaning action. Also, the carbon dioxide over the surface permits the co-solvent to be raised to a temperature for maximum chemical and sonic efficiency without concern for ignition. After the sonic treatment, the co-solvent is drained from the vessel. Since the liquid co-solvent rests upon the bottom of the vessel, the ultrasound transducers must be located below the top of the liquid co-solvent.

In all embodiments, the heating element 49 is preferably operated to warm the parts prior to opening the cleaning vessel 10 so there is no atmospheric condensation on the parts upon removal.

With methods utilizing both co-solvent and carbon dioxide, a valve 41a or 41b may be pulsed (rapidly opened and shut) to maximize recovery of the carbon dioxide. Pulsing helps to remove a rich solvent/carbon dioxide mixture at the bottom of the cleaning vessel. For example, it has been found that using this method, less than 2% makeup carbon dioxide must be added to the system in subsequent runs.

After the desired number of exchanges is complete, the valve 50a or 50b may be pulsed, for example, two seconds on/two seconds off, to release fluid collected at the bottom of separator 40 or 48 into recycle vessel 47. The pressure variation produced by the pulsing helps evolve a maximum amount of carbon dioxide out of solution with the solvent and contaminant, and that carbon dioxide is sent to condenser 42 for liquefication and storage in vessel 43.

Additionally, it has been found that in cases where acetone is used as a co-solvent, the separation of co-solvent carbon dioxide is complete upon reaching a certain temperature in the separator vessel 40. The temperature is monitored by a thermocouple. Experiments have demonstrated that when the temperature in the separator vessel reaches 3.5° C., it is an indicator that the acetone in the cleaning vessel has been displaced with carbon dioxide.

Figure 6:
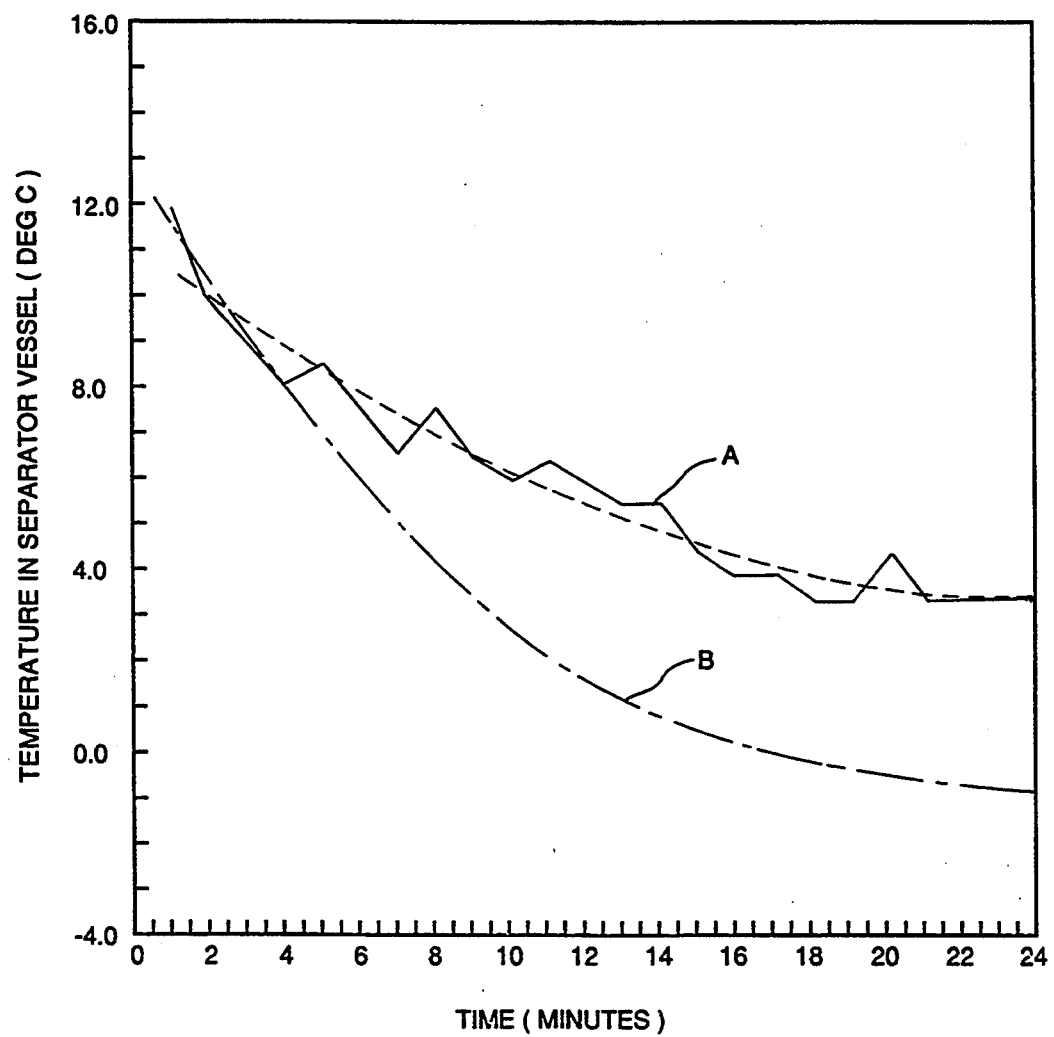
FIG. 6 is a graphic illustration of separator temperature versus time for a mixture of 5% acetone by weight and carbon dioxide, according to data collected during testing of the present invention.

Flushing of carbon dioxide through the cleaning vessel results in the continuous dilution of the co-solvent and also dilution of the contaminants being removed from the workpieces. In the case of certain co-solvents, the degree of dilution can be measured indirectly by measuring the temperature of the fluid entering the separator vessel. Referring to FIG. 6, the temperature in the separator vessel versus the time from the beginning of the flushing is plotted. The co-solvent was acetone. Curve B is a theoretical curve and curve A is experimentally determined. As can be seen, the temperature drops slowly as flushing continues for about 20 minutes and then levels out. Thus, it is possible to adjust the duration of the flushing period to meet the needs of a particular co-solvent and co-solvent concentration.

To display how co-solvents affect the critical temperature and pressure of the cleaning fluid, FIGS. 4 and 5 illustrate changes in critical temperature and critical pressure versus a percentage of acetone by weight of the mixture. Utilizing such curves, proper commands can be preprogrammed in the control system so that appropriate target pressures and temperatures are reached in the cleaning vessel to achieve the desired supercritical phase.

FIG. 5 is a graph of critical pressure of carbon dioxide in an acetone carbon dioxide mixture as a function of concentration of acetone in carbon dioxide. The pressure in the vessel during cleaning should be adjusted to ensure supercritical conditions during some portion of the cleaning cycle. Below the critical pressure, the acetone and carbon dioxide form a more homogenous mixture. It is therefore easier to distribute the co-solvent to the surface of the workpieces as by having means within the vessel to stir the solvent mixture within the vessel. Even below the critical pressure, the co-solvent tends to settle to the bottom of the cleaning vessel in some cases. Hence, selective removal of a mixture richer in co-solvent can be effected by discontinuing stirring and draining the vessel from the bottom particularly by turning the valve open for short periods of time (pulsing the valve) to draw the rich mixture from the bottom of the vessel. Still further it has been discovered that the separation of co-solvent to the bottom of the vessel is promoted by maintaining the pressure within the vessel above the critical pressure.

Appropriate co-solvents for use with this invention include aliphatics, terpenes, acetone, laminines, isopropyl alcohol, Axarel ®, a product of DuPont, Petroferm ®, a product of Petroferm Inc., kerosene and Isopar-m. All of these co-solvents are environmentally acceptable by today's standards.

Having thus described our invention with the detail and particularity required by the Patent Laws, what is claimed to be protected by Letters Patent is set forth in the following claims.

1. A system for cleaning a workpiece with a supercritical cleaning fluid, comprising:
   a pressurizable cleaning vessel for receiving the workpiece, said cleaning vessel having an inlet and an outlet;
   a letdown valve in communication with said outlet;
   a heater for controlling the temperature of said cleaning fluid in said cleaning vessel;
   a separator in communication with said letdown valve having a first outlet and a second outlet at a lower end of the separator;
   a condenser in communication with said separator first outlet for condensing gaseous cleaning fluid to a liquid state;
   a storage vessel for maintaining the liquid cleaning fluid;
   a pump for conveying cleaning fluid from the storage vessel to the cleaning vessel;
   a co-solvent supply vessel and a co-solvent delivery vessel; and
   means for placing the co-solvent delivery vessel in communication with the co-solvent supply vessel and means for placing said co-solvent delivery vessel in communication with said pump and said cleaning vessel, such that the cleaning fluid can be passed through the co-solvent delivery vessel to carry co-solvent into the cleaning vessel;
   whereby liquid cleaning fluid and co-solvent can be pumped from into the cleaning vessel and caused by temperature and pressure to achieve a supercritical state, said cleaning fluid can be removed from the cleaning vessel when said letdown valve is opened, and said removed portion passed to the separator.

2. The system according to claim 1 including a plurality of solvent storage vessels and a plurality of solvent transfer vessels, each storage vessel and transfer vessel being utilized to deliver a different solvent to the pressurizable cleaning vessel.

3. The system according to claim 1 including a pulse valve or a control for regulating fluid communication between said pressurizable cleaning vessel and said separator.

4. The system according to claim 1 including a thermocouple on said separator for monitoring the temperature in said separator.

5. The system according to claim 1 including a pre-cleaning vessel for pre-dipping the workpiece in a solvent prior to placing it in said pressurizable cleaning vessel.

6. The system according to claim 1 including a co-solvent storage vessel in communication with said pre-cleaning vessel.

7. The system according to claim 1 having means to bypass the co-solvent delivery vessel so that the pump can deliver cleaning fluid directly to the cleaning vessel.

* * * * *